United States Patent [19]

Hermanson et al.

[11] Patent Number: 4,556,890

[45] Date of Patent: Dec. 3, 1985

[54] CLEANING APPARATUS FOR A MAGNETOGRAPHIC RECORDING HEAD

[75] Inventors: Herman A. Hermanson, Penfield; Almon P. Fisher, Rochester, both of N.Y.

[73] Assignee: Xerox Corporation, Stamford, Conn.

[21] Appl. No.: 559,548

[22] Filed: Dec. 8, 1983

[51] Int. Cl.[4] .......... G01D 15/12

[52] U.S. Cl. .......... 346/74.4; 346/76 PH; 360/59; 360/128; 15/210 R

[58] Field of Search .......... 346/74.2, 74.5, 74.4, 346/76 PH; 358/301; 360/59, 128; 51/400, DIG. 5; 15/210 R; 226/196, 198

[56] References Cited

U.S. PATENT DOCUMENTS

| | | | |
|---|---|---|---|
| 2,992,447 | 7/1961 | Hicks | 360/128 X |
| 3,632,969 | 1/1972 | Walkow | 346/76 PH X |
| 3,731,289 | 5/1973 | Bajgert et al. | 360/128 |
| 3,964,104 | 6/1976 | Herron et al. | 360/128 |
| 4,266,256 | 5/1981 | Kato et al. | 360/128 |
| 4,294,556 | 10/1981 | Rix | 226/196 X |
| 4,402,599 | 9/1983 | Seto | 355/77 |
| 4,427,987 | 1/1984 | Kikuchi | 346/74.4 |
| 4,442,441 | 4/1984 | Kikuchi et al. | 346/74.4 |

OTHER PUBLICATIONS

IBM Technical Disclosure Bulletin, vol. 26, No. 2, Jul. 1983, entitled, "Magnetic Head On-Line Cleaning" by F. Ertingshaw et al.

*Primary Examiner*—E. A. Goldberg
*Assistant Examiner*—Fred L. Kampe
*Attorney, Agent, or Firm*—Robert A. Chittum

[57] ABSTRACT

A cleaning apparatus for a recording head in a magnetographic printing device of the type having a movable magnetic imaging tape in endless belt form is disclosed. The apparatus is especially effective for cleaning thermal printheads for thermoremanent magnetic imaging systems, and comprises a cleaning member adapted for reciprocal movement into and out of a nip formed by the magnetic tape and the printhead. In one embodiment, the cleaning member is a flexible substrate attached at one end to a rotatably mounted spool. The substrate is wound on the spool with the loose end resting on a guide plate and confronting the nip. The spool is periodically rotated to drive the substrate through the nip while the tape is moving and then is rotated in the opposite direction to rewind the substrate and withdraw it from the nip. In another embodiment, the cleaning member is a flexible substrate which is maintained in a planar configuration by parallel guide plates. A tractor wheel drive reciprocally moves the cleaning member into and out of the nip. The cleaning member may be a non-conductive, woven material having open spaces therein or a two layered composite having a non-conductive screen on one side to contact the tape and a carpet of short bristles on the other side to clean the printhead. Optionally, lateral movement of the cleaning member is provided after it enters the nip and the heating elements of the printhead may be momentarily energized to heat and soften the toner accumulated on the printhead to enhance the cleaning efficiency of the apparatus.

6 Claims, 10 Drawing Figures

CLEANING APPARATUS FOR A MAGNETOGRAPHIC RECORDING HEAD

FIELD OF THE INVENTION

The present invention relates to a cleaning apparatus for a magnetographic recording head and, more particularly, to a cleaning apparatus which periodically cleans the recording head during operation of the magnetographic printer by the insertion of a cleaning element into and through the nip formed by the magnetic tape and the recording head and by the withdrawal of the cleaning element from the nip.

DESCRIPTION OF THE PRIOR ART

Magnetographic copiers or printers of the type having a stationary recording head to receive video or digitized data signals and to imprint the signals as latent images on a moving magnetic tape as it passes in contact therewith may take a variety of structural configurations. Generally, such copier/printers have process stations downstream of the recording head which develop the latent magnetic image, transfer the developed image and clean or remove the residual development material such as magnetic toner. Subsequent to these processing stations the tape passes by an erase station to remove the latent image thereon so that the tape may receive a new latent magnetic image from the recording head. If the tape is in an endless belt configuration, multiple copies of the original latent image may be obtained by simply not energizing the erase station and by not energizing the recording head. Once the desired number of copies are made, the erase station is activated and the recording head may proceed to produce another latent magnetic image. As is well known in the prior art, the cleaning stations do not remove all of the toner particles and there may be some other tape contaminating particles, such as dust and paper particles, which settle or are attracted to the tape imaging surface. Accordingly, the surface of the recording head collects these particles from the tape as it slidingly moves by the stationary recording head. When enough contaminating particles have accumulated on the recording head, the recording by the head is degraded.

One solution to this problem, of course, is to periodically shut down the printer and manually clean the recording head surface which contacts the tape. The disadvantages of manual cleaning are appreciated by the prior art and a number of alternate solutions have been proposed.

U.S. Pat. No. 3,731,289 to T. A. Bajgert el al. discloses recording head cleaning apparatus in which a cleaning web or ribbon having one cleaning surface for engaging the recording head and a second cleaning surface for engaging the magnetic tape's imaging surface to clean both the head's surface and at least a portion of the tape. FIG. 6 discloses an embodiment wherein the cleaning ribbon 50 is wound on a rotatable shaft 51. The shaft is adapted for periodic rotation to lower the loose end of the cleaning ribbon into contact with the moving magnetic tape 24, so that the ribbon is drawn into the head/tape interface. At the end of the cleaning cycle, the ribbon is withdrawn and restored on the shaft by rotation of the shaft to roll up the ribbon thereon so that the loose end of the ribbon is positioned out of the tape path.

U.S. Pat. No. 4,266,256 to K. Kato et al. discloses an improved cleaning ribbon which is periodically inserted between the magnetic tape and the magnetic recording head. The tape is a composite comprising a layer of nylon or synethic fiber non-woven fabric for cleaning the head and a paper material for cleaning the tape. The two materials are joined by an adhesive. The cleaning tape is periodically inserted between the head and the tape at a right angle to the tape and tape movement direction.

IBM Technical Disclosure Bulletin (TDB) Vol. 26, No. 2, July 1983 discloses on-line debris removal from magnetic heads during the operation of rigid magnetic disks by occasionally moving the head for a short time to a special wear track.

U.S. Pat. No. 3,964,104 to C. C. Herron et al. discloses a head cleaner for a rotating magnetic head without interrupting the operation of the recording device. The cleaning is achieved by a rotatable brush wheel mounted at an angle to the path of the rotating head. The brush wheel makes intermittent contact with the head and with the surface of the rotor carrying the magnetic head. Rotary motion of the rotor is transmitted to the brush wheel when it is in contact with the rotor, causing the brush wheel to rotate. The rotating brush wheel bristles flick the debris from the magnetic head into a housing surrounding the brush wheel and a vacuum applied to the housing removes the debris therefrom.

U.S. Pat. No. 4,402,599 to Y. Seto discloses a means for cleaning the scanning surface of an optical fiber tube referred in the specification as reproducing means. FIG. 6 shows an embodiment wherein a cleaning sheet A has one end fixed to a spool, which is parallel to the axis of photosensitive drum. The cleaning sheet is rolled up on the spool and held this way by a ratchet and pawl arrangement. In the cleaning mode, the pawl is released from the ratchet and the cleaning sheet is allowed to unroll from the spool. A charge is placed on the drum to electrically attract and hold the clean sheet free portion that is unwound from the spool to the drum surface. As the drum rotates by the reproducing means, the scanning surface thereof is cleaned. When the cleaning sheet has completely unrolled from the spool, the drum is reversed and the cleaning sheet taken up on the spool by the ratchet and pawl arrangement which is in synchronism with the reverse rotation of the drum.

SUMMARY OF THE INVENTION

It is the object of this invention to clean periodically the magnetic recording head without interrupting the movement of the magnetic tape through its transport system or moving either tape or recording head from the operating position and to clean the recording head without damaging the tape.

It is another object of this invention to clean periodically a thermal printing head used in a thermoremanent magnetic imaging device without damaging the magnetic tape.

It is still another object of this invention to insert periodically a cleaning member between the printing head and the imaging surface of a magnetic tape while the tape is moving and then withdraw the cleaning member to remove magnetic toner particles and other debris which has accumulated on the magnetic recording head or thermal printing head without damaging the tape imaging surface.

It is a further object of this invention to insert a cleaning member into the nip formed by the magnetic tape and the thermal printing head, move the cleaning member laterally in a direction perpendicular to the direction of insertion to remove contaminating particles lodged on both sides of the protruding thermal elements of the printing head, and then withdrawing the cleaning member either during the lateral movement of the cleaning member or after the lateral movement.

It is yet another object of this invention to use a composite cleaning member to clean periodically the thermal printing head in which the surface of the cleaning member contacting the printing head is covered with relatively short bristles to scrub the toner particles from around the linear array of protruding thermal elements.

The present invention relates to a cleaning device for cleaning the latent magnetic image recording head in a magnetographic printing device. Though useful for cleaning the smooth surface of a typical magnetic recording head, this invention is particularly useful in periodically cleaning a thermal printing head having a plurality of heating elements that form a ridge across the surface of the printing head. The ridge in the printing head prevents the prior art cleaning devices from removing the toner particles that have accumulated on the sides of the ridge.

One embodiment of the present invention comprises a flexible cleaning member constructed of a plastic material in a woven configuration having spaces therein, such as, for example, a piece of ordinary plastic screen. Such a material has been found not to damage the magnetic imaging surface of the magnetic tape.

Another embodiment of the cleaning member is a two layered composite sheet having a plastic screen layer on the side that contacts the imaging surface of the tape and the other layer contains short, relatively stiff but flexible bristles for scrubbing the toner particles from around the heating elements forming the ridge of the thermal printing head.

The cleaning member, either embodiment, may be attached at one end to the cylindrical surface of a spool. The cleaning element is wound up on the spool with the loose end of the cleaning member resting on a guide plate near the nip formed by the movable magnetic tape and the magnetic recording head or the thermal printing head. The spool is mounted on a driven shaft which is periodically rotated in a direction to run the cleaning member into and through the nip while the tape moving over the printing head. The movement of the cleaning member into the nip is in the same direction as that of the tape so that the entrance into the nip and continued movement therethrough is assisted by the movement of the tape. Once the cleaning member has been inserted through the nip, it is withdrawn by reversing the direction of the driven shaft.

After the cleaning member has been inserted into the nip and prior to its withdrawal, the spool and cleaning member may be moved laterally to that of the insertion direction, so that the plastic screen in one embodiment or the bristles in the other embodiment move parallel to the printing head ridge to provide additional dislodging action against the toner particles. The lateral movement may be prior to withdrawal of the cleaning member from the nip or during the withdrawal.

Alternatively, either embodiment of the cleaning member of the present invention may be maintained as a flexible planar member which is moved into and through the nip in a reciprocating manner. Any prior art technique for providing the push-pull action on the cleaning member will suffice. In this alternate embodiment of the cleaning device, the cleaning member is moved from an inoperative position on the planar guide plate to an operative position wherein it is moved partially off the guide plate. A portion of the cleaning member that is off the guide plate is inserted into the nip formed by the tape and printhead. After a predetermined amount of time, the cleaning device withdraws the cleaning member from the nip. Optionally, the cleaning member may be provided with a lateral movement relative to the push-pull direction of the cleaning member either prior to its withdrawal from the nip or during the withdrawal.

If the orientation of the nip requires a substantially vertical insertion and withdrawal direction by the planar cleaning member, it may be sandwiched between two parallel guide plates while it is in the inoperative position. The parallel guide plates serve the dual purpose of maintaining a non-rigid cleaning member substantially in a plane and of aiming the cleaning member into the nip when it is being moved toward the operative position through the nip.

Further assistance in the removal of the toner particles may be obtained by momentarily energizing the heating elements during the insertion of the cleaning member. This softens the toner particles and they adhere better to the cleaning member.

DESCRIPTION OF THE PREFERRED EMBODIMENT

Figure 1:
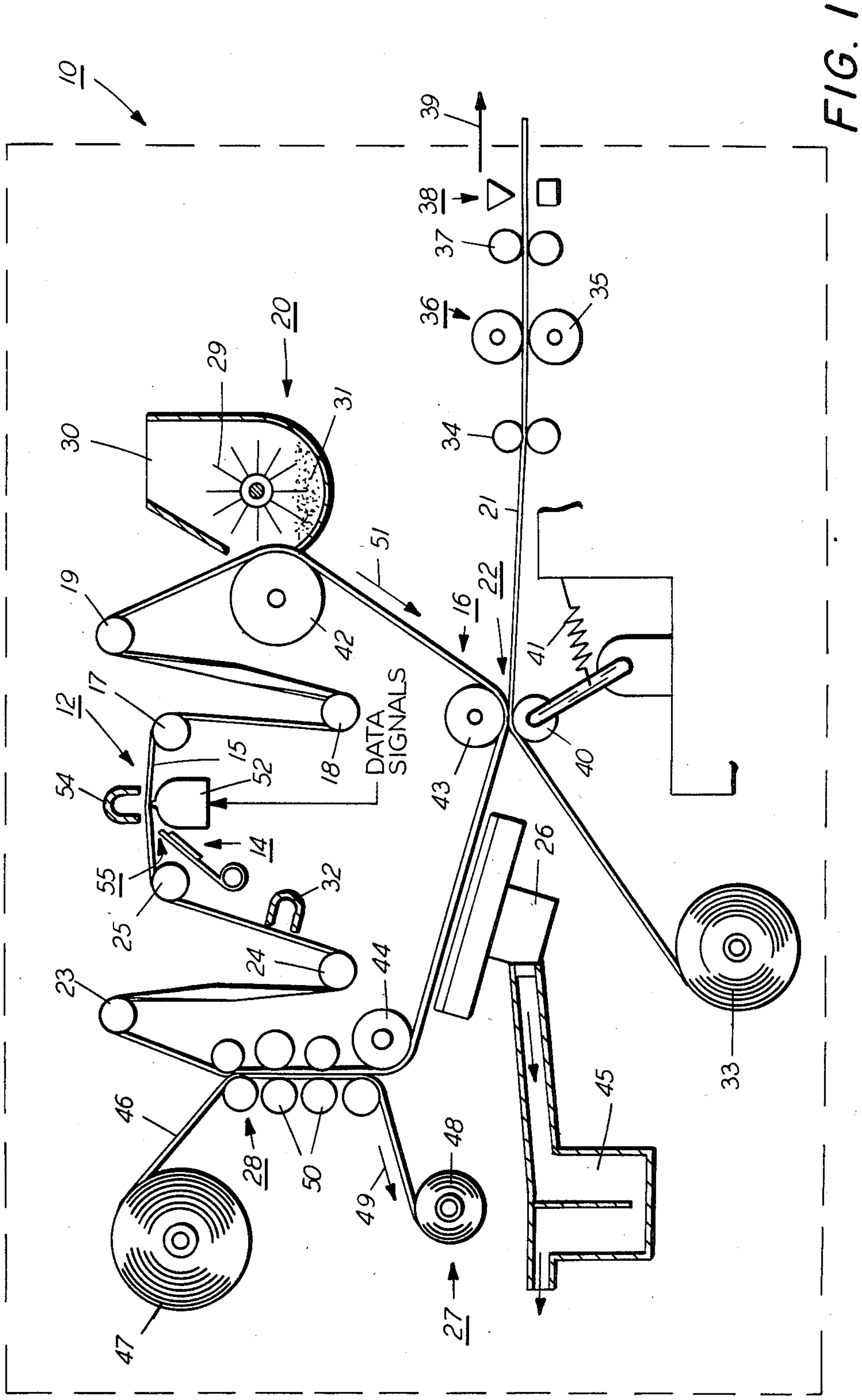
FIG. 1 is a schematic system diagram of a magnetographic imaging system having the recording head cleaning apparatus of the present invention in which a nip is formed by a magnetic tape and a recording head with the tape being above the head.

Referring to the system diagram of FIG. 1, there is shown a thermoremanent printing system, generally designated by the numeral 10, incorporating a magnetic imaging station 12 with the cleaning apparatus 14 of the present invention associated therewith; the cleaning apparatus is more fully described later with reference to the other Figures. Though a thermoremanent printing system is shown, a typical magnetic printing system could use equally well the cleaning apparatus of the present invention.

The printing system 10 includes a series of process stations through which a magnetic recording medium 16 in the form of an endless magnetic tape or belt passes. Although the preferred embodiment uses an endless belt configuration for the recording medium, various other configurations (not shown) could be used equally as well such as, for example, one having a supply roll and a takeup roll which may be rewound on the supply roll from the take-up roll and reused when the supply is depleted.

Beginning with the imaging station 12, the magnetic belt 16 proceeds consecutively past guide rollers 17, 18 and 19, of which guide roller 18 is adjustable to assist in maintaining appropriate tension on the belt, a development station 20, a transfer station 22, a two stage belt cleaning station 27 having a vacuum cleaning means 26 and final web cleaning system 28 and guide rolls 23, 24 and 25. Guide roller 24 is also adjustable. The belt moves in direction of arrow 51 and belt guide rollers 18, 19 and 24, 25 invert the belt so that the magnetic imaging surface 15 faces inward of the closed loop while passing through the imaging station 12 and outwardly for the convenience of processing by the other stations. The development, transfer, and cleaning stations are typical stations well known in the prior art.

The adjustable rollers 18 and 24 are made of graphite to lubricate and to reduce drag on the belt 16 as it moves around the printing system. It has been found that graphite will not mark or damage the belt, even if the rollers do not rotate.

Figure 1A:
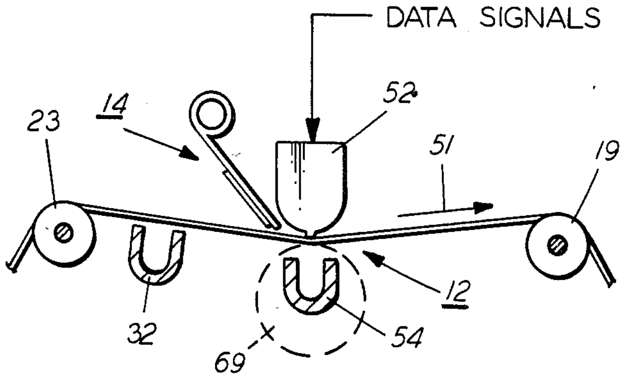
FIG. 1A is a portion of the schematic system diagram of FIG. 1 showing the recording head cleaning apparatus of the present invention, but with the nip being formed with the tape below the recording head.

In FIG. 1A, the imaging station is shown with the magnetic imaging surface 15 of the belt 16 facing outward of the belt loop so that the magnetic belt does not have to be inverted as does the configuration of Figure 1. This means that guide rollers 24, 25, 17 and 18 are not required. The FIG. 1A configuration may also provide a longer operational lifetime for the magnetic belt 16 because it does not have the belt inversions which may add stress through the constant twisting thereof while the printing system 10 is operating.

With the magnetic imaging surface 15 of the belt 16 facing outwardly of the loop formed by the endless belt, the cleaning apparatus 14 of the present invention is located upstream of the moving belt direction depicted by arrow 51 and above the belt. A printing pressure roller 69 is an optional element for the printing system and is shown in dashed lines.

At development station 20 shown in FIG. 1, a rotating brush or paddle wheel 29, housed in hopper 30, presents magnetic toner particles 31 onto the magnetic imaging surface 15 of the magnetic belt 16 as the belt moves around support roller 42. The toner particles are attracted and held by the latent magnetic image recorded on the imaging surface of the belt at the imaging station 12, thus developing and rendering the latent image visible. The developed image is transferred to a permanent material 21, such as paper, at the transfer station 22. After the developed image is transferred, the belt proceeds past the dual cleaning station 27, past a pre-magnetizing magnet 32 and back to the imaging station 12.

The developed image is pressure transferred to the paper 21 at the transfer station 22. The paper is provided by supply roll 33 which is pulled through the transfer station via drive rolls 34 and through a toner particle fixing station 36 by drive rolls 37, whereat the developed image on the paper is permanently fixed thereto by means well known in the prior art, such as, by fusing rolls 35 which apply heat and pressure to the developed image.

Cutter assembly 38 cuts the paper 21 with the fixed images into separate sheets as the paper moves in the direction of arrow 39 and exits from the printing system 10 into a collection tray or sorter (not shown). The transfer station includes pressure roller 40 which is urged by adjustable spring 41 towards the magnetic recording belt 16 as it moves around support roller 43. The paper is squeezed against the developed toner image between rollers 40 and 43 to effect the pressure transfer. An electrostatic transfer technique, as is well known in the art, could also be used to effect transfer of the toner image to the paper.

Subsequent to the developed image transfer, the recording medium is moved past the two-stage cleaning station 27 which removes any residual toner particles not transferred to the paper. The first stage is located between support rollers 43 and 44 and comprises a vacuum system 26 connected to a vacuum source (not shown) which removes a large percentage of the residual toner from the belt and into a baffled plenum chamber 45 where most of the air entrained toner particles are collected. The toner particles not collected in the plenum chamber 45 are removed from the vacuum exhaust by well known means, such as filters (not shown). The toner particles collected in the chamber may be periodically removed and reused. The second stage of the cleaning station comprises a cleaning web 46 which is slowly pulled in rubbing contact with the imaging surface of the belt downstream from the first cleaning stage. The web is provided on supply roll 47 which is slowly pulled through the second cleaning system 28 by driven take-up roll 48 in the direction of arrow 49. Several pairs of pressure rollers 50 provide more than one rubbing contact point by the web on the belt in a direction of movement that is opposite to that of the belt moving direction. The multiple pairs of pressure rollers assure that the belt imaging surface is clean enough to accept another image at the imaging station.

For multiple copies of the same image, the pre-magnetizing magnet 32 is moved to a location where its magnetic field will not erase the latent magnetic image by pre-magnetizing the tape and the imaging station is de-energized with the magnetizing field at the imaging station also removed.

One of the preferred choices for the magnetic recording belt 16 is a magnetic tape having a chromium dioxide recording surface sold under the trade name Croyln ® by the E. I. DuPont Company, Wilmington, Del. The curie point of Crolyn is about 132° C., which is low enough to provide excellent results in a thermoremanent magnetic imaging environment.

The imaging station 12 utilizes a thermoremanent magnetic imaging process. One such process is disclosed in copending U.S. application Ser. No. 515,720 filed July 20, 1983 to R. E. Drews et al. and assigned to the same assignee as this invention. This commonly assigned application of R. E. Drews et al. is incorporated by reference herein. The magnetic recording belt 16 having a magnetizable imaging surface 15 moves around guide rollers 25 over a thermal printhead 52 and around guide roller 17 in the direction of arrow 51. The thermal printhead is adjustably positioned to be in tension contact with the belt imaging surface to insure contact with the linear heating elements of the printhead. Several commercially available thermal printheads perform thermoremanent magnetic imaging very well. One is marketed by the Rohm Corporation under the designation Rohm Kh-106-6 and another is a 300 heating elements per inch or spots per inch (spi) printhead sold by the Mitsubishi Electric Corporation of Japan under the designation S 215-12. The tensioning force of the thermal printhead 52 may be varied so that the force of contact by the thermal elements 53 (FIG. 2) effectively apply from 0.1 to 6 pounds per lineal inch (pli) on the belt, the preferred range being 0.4 to 4 pli.

The latent magnetic image is produced by energizing selected thermal heating elements with data signals such as digitized information signals from a typical character generator, computer or CCD scanner (not shown). The heating elements each heat small areas or pixels of the imaging surface 15 of the belt 16 above the curie point of the surface in the presence of a magnetizing field produced by permanent magnet 54 of opposite polarity to that of pre-magnetizing magnet 32. The pre-magnetization is erased in the heated pixels and the magnetizing field of magnet 54 is able to induce a magnetism in the pixels having an opposite polarity. The magnetic field strength of magnet 54 is smaller than that of the pre-magnetizing magnet 32, so that the pre-magnetization of the belt imaging surface 15 will not be affected except in the heated pixels. The actuation time of the thermal elements 53 in conjunction with the surface speed of the belt enables the heated pixel areas to cool while still in the magnetic field of magnet 54, thus freezing the switched magnetization regions in the pixel areas. The opposing magnetization of the pixels in the pre-magnetization background area form fringe fields in image configuration, that is, the latent magnetic image, and hold magnetic toner particles applied at the developing station 20.

Gradually, over a period of operating time, the very small amount of toner particles not removed by the two-stage cleaning station accumulate on both sides of the thermal heating elements 53 which protrude above the surface of the thermal printhead approximately 20 $\mu$m (microns). The thermal printhead cleaning apparatus 14 of FIG. 1 is located below the magnetic recording belt 16 and on the upstream side of the thermal printhead 52, while the cleaning apparatus of FIG. 1A, as stated above, is located above the belt and on the upstream side of the printhead. Periodically, the printhead cleaning apparatus, more fully described below, is actuated to clean the toner particle and other accumulated debris from around the heating elements.

Figure 2A:
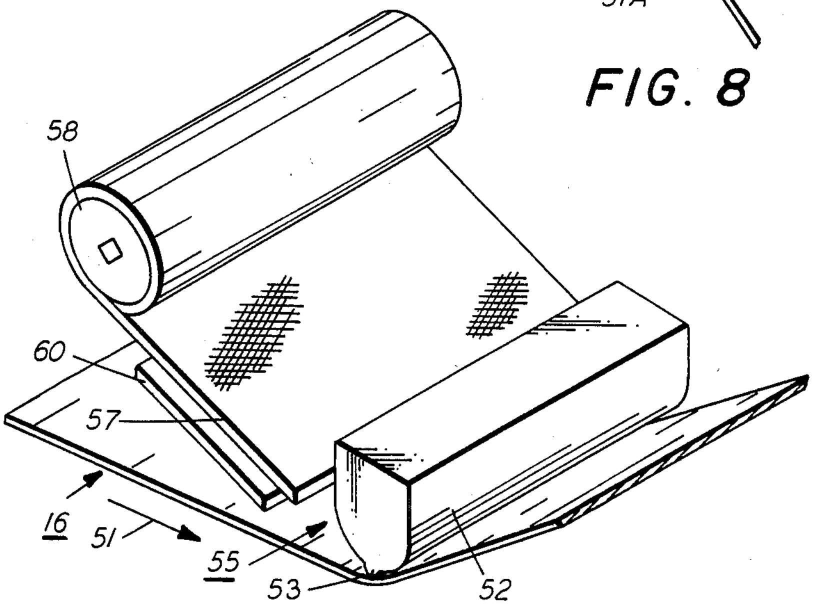
FIG. 2A is an enlarged perspective view of the cleaning apparatus of FIG. 1A with the recording head being shown as a thermal printing head.
Figure 2:
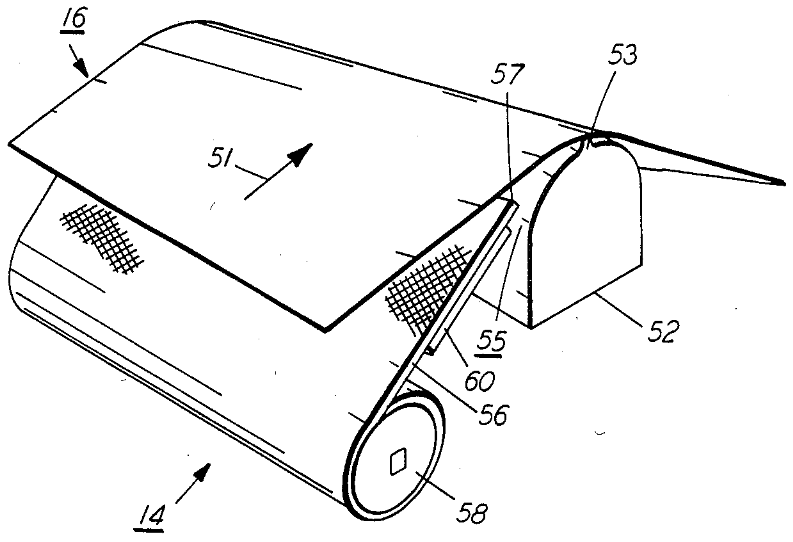
FIG. 2 is an enlarged perspective view of the cleaning apparatus of FIG. 1 with the recording head being shown as a thermal printing head.

As better seen in FIG. 2, the printhead cleaning apparatus is a flexible sheet 56 of woven material having openings therethrough. The sheet material may be plastic or the like. As a matter of fact, an ordinary piece of plastic screen works quite well. One end of the plastic screen or woven sheet 56 is attached to a spool 58 and then is wound thereon until the loose end rests on guide plate 60. The edge 57 of the loose end of the screen 56 is adjacent the nip 55 formed by the moving belt 16 and the thermal printhead 52. At predetermined times, the spool is rotated by means not shown in a direction to move the screen edge 57 through the nip 55 and then the spool is rotated in the opposite direction to rewind the screen 56 on the spool, withdrawing the screen to its original position while the belt is moving. This lizard-tongue-like movement of the flexible, woven sheet or screen 56 into and out of the nip 55 removes the collected toner particles from the thermal printhead.

FIG. 2A shows a very similar printhead cleaning apparatus to that of FIG. 2. The only difference between the two configurations is that of their location or orientation, as explained above with reference to FIGS. 1 and 1A.

Figure 3:
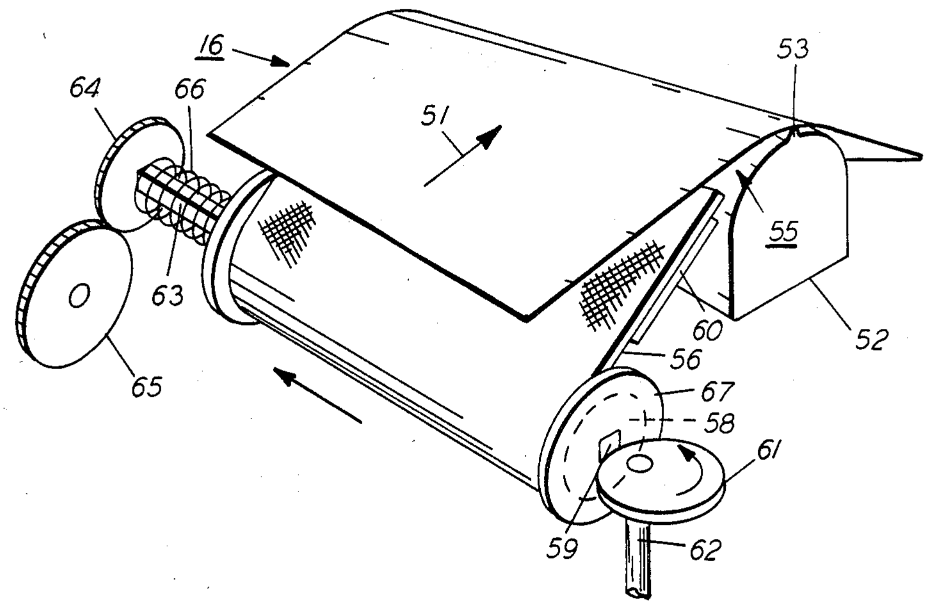
FIG. 3 is an enlarged perspective view of another embodiment of the cleaning apparatus shown in FIG. 2.

Increased amounts of accumulated toner particles are removed by adding a lateral movement to the screen 56 after it is inserted through the nip 55 or during the withdrawal of the screen. A schematic representation of the apparatus to produce this lateral motion of the screen is shown in FIG. 3. The spool 58 is mounted on a rotatable shaft 63 which prevents rotation of the spool thereon. The rotation prevention of the spool with respect to the shaft may be accomplished in many well known ways, but the embodiment shown in FIG. 3 is by way of a square axial mounting hole 59 in the spool 58 which is slidingly mounted on a square shaft 63. The square shaft is longer than the spool. The spool is mounted on one end portion of the square shaft and a gear 64 is mounted on the other end of the square shaft. Gear 64 is engaged with drive gear 65 and rotated in the desired direction by well known means not shown. Spring 66 is mounted between the spool 58 and the gear 64 and urges the spool away from the gear 64. Circular cam 61 rotates against the spool end opposite to the end adjacent spring 66 at predetermined times by well known means (not shown). The cam rotates on shaft 62 to slide the spool and thus the screen (cleaning member 56) along the square shaft, compressing the spring 66. As the cam rotates to its original position, the spring moves the spool (and screen) back to its original position.

Figure 4:
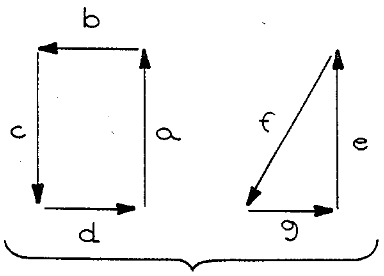
FIG. 4 is a diagram showing the two different motions available for the cleaning member of the cleaning apparatus in FIG. 3.

FIG. 4 shows the general movement direction of the cleaning member or screen 56 with respect to the thermal printhead 52. Arrow "a" is the direction of screen movement across the printhead, arrow "b" is the lateral movement of the screen as the circular cam moves spool along the square shaft. Arrow "c" is the withdrawal direction of the screen from the nip 55 as the screen is rewound on the spool 58. Arrow "d" is the lateral movement of the spool by the spring 66 after the screen has been rewound on the spool. Arrows "e, f and g" depict the movement of the screen when the cam 61 laterally moves the spool during the time that the screen is being withdrawn from the nip 55. Arrow "e" shows the direction of movement of the screen into the nip 55 and over the heating elements 53. Arrow "f" shows the direction of movement of the screen when it is being withdrawn while the spool and screen are being moved laterally or parallel to the heating elements by the cam 61. After the screen is rewound on the spool, the spool is returned laterally in the direction of arrow "g" to its original position by the spring 66.

Figure 6:
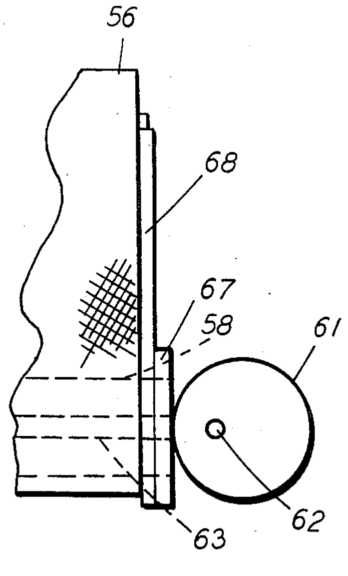
FIG. 6 is a partial plan view of the embodiment of FIG. 3 showing the addition of cleaning member stiffening arms.
Figure 7:
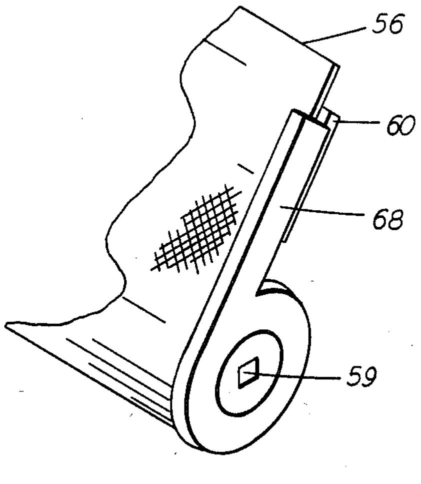
FIG. 7 is a perspective schematical view of one of the stiffening arms of FIG. 6.

If the cleaning element or screen 56 is too resilient to be laterally moved by the spool while the cleaning element is engaged through the nip 55, then, as shown in FIG. 6, a pair of arms 68 slidingly mounted on the spool, one on each side of the rolled up cleaning element and sandwiched between the cleaning element and the spool flanges 67, will provide added stiffness to the portion of the cleaning element resting on the guide plate 60, thus preventing the cleaning element from wrinkling up during the lateral movement. FIG. 7 shows a perspective view of one of the arms 68 mounted on the spool with the spool flange removed for clarity. The apparatus for laterally moving the cleaning element shown in FIGS. 3, 4, 6 and 7 applies, of course, to both of the embodiments shown in FIGS. 2 and 2A.

Figure 5:
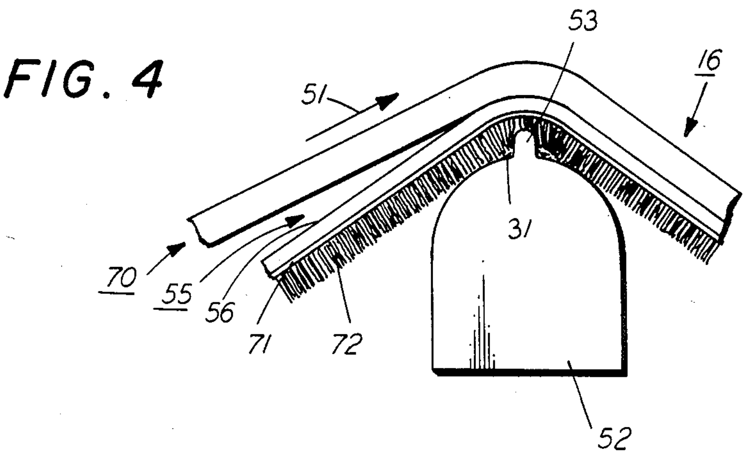
FIG. 5 is an enlarged schematical side view of one embodiment of the cleaning member of the cleaning apparatus shown in FIG. 2 or 3, depicting movement of the cleaning member through the nip formed by the magnetic tape and the thermal printing head.

A second embodiment of the cleaning element 56 is shown in FIG. 5. The second cleaning element embodiment 70 is composed of two layers, one is the plastic woven material or screen 56 and the other layer is a base material 71 having bristles 72 embedded therein. The bristles are short and relatively stiff, but flexible. One example of a base material with bristles found to work exceptionally well was a piece of commercially available fastening material sold under the trade name of Velcro ®. The Velcro side having the hooks was sanded to remove the hooks and leave short, stubby bristles. The plastic screen side of the composite contacts the imaging surface 15 of the belt 16 to prevent damage thereto. The bristles 72 flex and scrub substantially all of the toner particles 31 or other debris from around the protruding heating elements 53, as the cleaning element 70 is inserted into the nip 55 removed therefrom. This cleaning element has enough transverse stiffness to eliminate the need for stiffing arms 68 shown in FIGS. 6 and 7 when the cleaning element is optionally moved laterally according to the technique disclosed by FIG. 3.

To further enhance removal by the cleaning element 70 some or all of the heating elements may be momentarily energized to heat and soften the toner particles to aid in their removal by the bristles 72, as the bristles 72 scrub over and back across the protruding heating elements. It has been found that the slight heating of the toner particles improves the efficiency of the toner particle removal. However, if the heating elements 53 are energized to increase the cleaning efficiency of cleaning element 70, material choices for the bristles must be made from those which can withstand the intimate contact with the heated elements, so that the bristles do not melt or stick to them as they scrub thereover.

Figure 8:
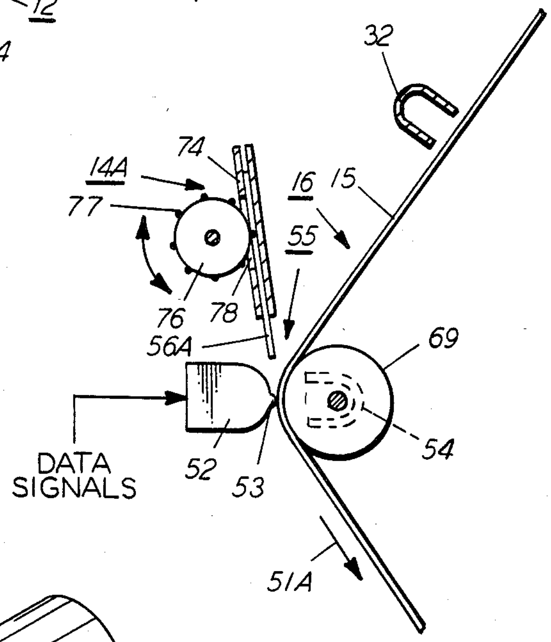
FIG. 8 is a schematic diagram of an alternate embodiment of recording head cleaning apparatus having a planar cleaning member.

In the alternate embodiment of the cleaning apparatus 14A shown in FIG. 8, the cleaning element 56A may be similar to that of the plastic screen of the configuration shown in FIGS. 2 and 2A or it may be similar to that of the composite shown in FIG. 5. The magnetic belt 16 moves in the direction of arrow 51A and around rotatable pressure roll 69. Pressure roll 69 urges the imaging surface 15 of the belt into intimate, pressure contact with the heating elements 53 of thermal printhead 52, so that data signals received by the heating elements produce a latent thermoremanent magnetic latent image therein. Permanent magnet 54 is shown stationarily mounted within rotatable roll 69 and is shown in dashed lines.

With the nip 55 shown in substantially vertical orientation, the cleaning element 56A must move substantially in a vertical plane through the nip. The alternate embodiment depicts the cleaning element schematically as a planar member sandwiched between two parallel, vertical guide plates 74. Any well known means may be used to position and to move the planar cleaning element through the nip 55 and then withdraw it in a lizard-tongue action, but FIG. 8 shows a tractor wheel drive means 76. Holes (not shown) in the cleaning element and opening 78 in at least one guide plate 74 receive the tractor wheel extensions 77 which provide positive drive action of the cleaning element into and out of the nip to clean the printhead 52. The portion of the cleaning element 56A which enters the nip, of course, should not have the holes for the tractor wheel extensions.

Lateral movement of the cleaning element may be optionally provided in a manner similar to that shown in FIGS. 3, 4, 6 and 7 except that it is the tractor wheel 76 which is moved with the cleaning element instead of the spool 58. The opening 78 in the guide plate 74 must be wide enough to accommodate the lateral movement of the tractor wheel and extensions 77.

In recapitulation, the present invention provides the technique and apparatus for efficiently and effectively cleaning a magnetic recording head or a thermal printhead for a magnetographic or thermoremanent magnetographic printing device. Specifically, the cleaning apparatus comprises a sheet-like cleaning member constructed in a woven but spaced configuration of plastic material such as, for example, an ordinary plastic screen. The cleaning member may, alternatively, be a composite of two layers, one of plastic screen and the other having a carpet of short, stiff but flexible bristles. The cleaning member in one embodiment is attached at one end to a spool and wound therearound with the free end resting on a guide plate near the nip formed by the magnetic tape or belt and the recording head or printhead. Periodically, the spool is unwound to force the cleaning member through the nip and then the spool rotated in the other direction to rewind the cleaning member and withdraw it to remove toner particles that have accumulated on the recording/printhead. An alternate embodiment provides for periodic movement of a planar cleaning member, sandwiched between two parallel guide plates, into and out of the nip to clean the printhead. Though this embodiment is shown oriented in a substantially vertical position, it could be used in any orientation. Means is provided to move the cleaning member laterally of the insertion direction to improve the toner particle removal from thermal printheads either before withdrawal of the cleaning member or during the withdrawal. Stiffening arms are provided if the cleaning member tends to wrinkle during the lateral movement. Further enhancement of the cleaning efficiency is achieved by slightly heating the toner particles around the heating elements of the thermal printhead by momentarily energizing some or all of the heating elements.

Many modifications and variations are apparent from the foregoing description of the invention and all such modifications and variations are intended to be within the scope of the present invention. It should also be appreciated that this cleaning apparatus would be applicable to other in-contact image bar printers, where, for example, the image bar or associated lens system such as fiber optics or Silfoc ® lens are positioned adjacent a moving photoreceptor.

We claim:

1. Apparatus for cleaning toner particles from a stationary recording head in a magnetographic printing device of the type having a movable magnetic belt which has on one surface thereof a magnetizable layer for receiving latent magnetic images from said recording head and which moves consecutively after imaging through stationary printing processing stations, the cleaning apparatus comprising:

a cleaning element having a flexible, woven, screen-like configuration of an electrically non-conductive material with openings therethrough, the element having first and second ends, the first end being attached to a rotatably mounted spool and a major portion of said element being wound thereon;

a guide plate located upstream of the recording head and adjacent a nip formed by the movable magnetic belt and the recording head, the guide plate being for supporting the loose second end of the cleaning element while the cleaning element is wound on the spool;

means for periodically rotating the spool in a direction substantially parallel with the moving direction of the magnetic belt to drive the cleaning element second end into and through the nip;

means for rotating the spool in an opposite direction to rewind the cleaning element thereon each time the cleaning element second end is inserted through said nip and to return the loose second end to the guide plate, so that the portion of the cleaning element which enters the nip scrubs the toner particles from the recording head during entry and withdrawal without wearing or damaging the magnetizable surface of the magnetic belt; and means for laterally moving the cleaning element after insertion thereof through the nip, said lateral movement being completed either prior to withdrawal of the cleaning element from the nip to impose an additional scrubbing action perpendicular to the moving direction of the magnetic belt or during said withdrawal to impose an additional net scrubbing direction that is at an acute angle with the moving direction of the magnetic belt, so that the cleaning element provides a combination of scrubbing directions each time the cleaning element is inserted through and withdrawn from said nip.

2. The apparatus of claim 1, wherein the printing device is a thermoremanent magnetographic printing device and the recording head is a thermal printhead having a linear array of heating elements protruding from the printhead surface along a line across the center thereof and transverse to the direction of movement of the magnetic belt; and wherein the cleaning element is of a composite construction comprising:

a plastic screen layer for preventing wear and damage to the magnetizable surface of the magnetic belt during rubbing contact therewith; and a non-conductive layer having a first surface in contact with the plastic screen and a second surface for holding a coating of relatively short bristles which are perpendicular thereto, the bristles bending and flexing across the protruding heating elements as the cleaning element is moved through and withdrawn from the nip, so that the toner particles lying on the thermal printhead at the base of the heating elements are removed in spite of difficulty presented by the protruding heating elements.

3. The apparatus of claim 2, wherein the cleaning apparatus further comprises means for selectively and momentarily energizing the heating elements of said printhead to heat and soften the toner particles thereon, so that the cleaning element bristles may more efficiently remove them.

4. Apparatus for cleaning toner particles and other debris from a stationary thermal printhead of a thermoremanent magnetographic printing device of the type having a movable magnetic belt in an endless loop, said belt moving past fixed printing process stations one of which is an imaging station that includes the thermal printhead, while the device is operatively printing, the magnetic belt having a magnetizable layer on one surface thereof for receiving latent magnetic images from the thermal printhead, and said thermal printhead having a linear array of heating elements protruding from the printhead surface along a line across the center thereof and transverse to the direction of movement of the magnetic belt, the cleaning apparatus comprising:

a flexible, planar cleaning member adapted for periodic reciprocal movement of a portion thereof into and out of a nip formed by the thermal printhead and the magnetic belt, the cleaning member having a woven, screen-like configuration with openings therethrough;

at least one guide plate for maintaining the cleaning member in a plane and for guiding a portion of the cleaning member into the nip;

means for reciprocally driving the cleaning member towards and away from said nip, so that said portion of the cleaning member entering the nip removes toner particles and other debris from the thermal printhead without either the belt or the thermal printhead being moved into an inoperative position and without wearing or damaging the magnetizable layer of the magnetic belt, said reciprocal driving means being a pair of driven tractor wheels which engage apertures on each edge of the cleaning member for positive traction therewith, the width of the cleaning member being such that the apertures for the tractor wheels lie outside of the width of the recording head; and means for laterally moving the cleaning element after insertion thereof through the nip, said lateral movement being completed either prior to withdrawal of the cleaning element from the nip to impose an additional scrubbing action perpendicular to the moving direction of the magnetic belt or during said withdrawal to impose an additional net scrubbing direction that is at an acute angle with the moving direction of the magnetic belt, so that the cleaning element provides a combination of scrubbing directions each time the cleaning element is inserted through and withdrawn from said nip.

5. The cleaning apparatus of claim 4, wherein the cleaning member is of a composite construction comprising:

the planar screen cleaning member for preventing wear and damage to the magnetizable layer of the magnetic belt during rubbing contact therewith; and a non-conductive layer having a first surface in contact with the plastic screen and a second surface for holding a coating of relatively short bristles which are perpendicular thereto, the bristles bending and flexing across the protruding heating elements as the cleaning element is moved through and withdrawn from the nip, so that the toner particles lying on the thermal printhead at the base of the heating elements are removed in spite of difficulty presented by the protruding heating elements.

6. The cleaning apparatus of claim 5, wherein the cleaning apparatus further comprises means for selectively and momentarily energizing the heating elements of said printhead to heat and soften the toner particles thereon, so that the cleaning element bristles may more efficiently remove them.

* * * * *